(12) United States Patent
Hanschmann et al.

(10) Patent No.: US 10,124,441 B2
(45) Date of Patent: Nov. 13, 2018

(54) LASER METAL DEPOSITION WELDING OF AUTOMOTIVE PARTS

(71) Applicants: MAGNA INTERNATIONAL INC., Aurora, Ontario (CA); Florian Hanschmann, Toronto (CA); Jeremy Brian Magda, Brampton (CA); Kevin Dale Smith, Sterling Heights, MI (US)

(72) Inventors: Florian Hanschmann, Toronto (CA); Jeremey Brian Magda, Brampton (CA); Kevin Dale Smith, Sterling Heights, MI (US)

(73) Assignee: Magna International Inc., Aurora (CA)

( * ) Notice: Subject to any disclaimer, the term of this patent is extended or adjusted under 35 U.S.C. 154(b) by 92 days.

(21) Appl. No.: 14/436,894

(22) PCT Filed: Oct. 24, 2013

(86) PCT No.: PCT/US2013/066494
§ 371 (c)(1),
(2) Date: Apr. 19, 2015

(87) PCT Pub. No.: WO2014/066569
PCT Pub. Date: May 1, 2014

(65) Prior Publication Data
US 2015/0251274 A1    Sep. 10, 2015

Related U.S. Application Data

(60) Provisional application No. 61/718,089, filed on Oct. 24, 2012.

(51) Int. Cl.
*B23K 26/24*    (2014.01)
*B23K 35/30*    (2006.01)
(Continued)

(52) U.S. Cl.
CPC .............. *B23K 26/24* (2013.01); *B23K 26/32* (2013.01); *B23K 35/0244* (2013.01);
(Continued)

(58) Field of Classification Search
CPC .... B23K 26/24; B23K 26/32; B23K 35/3033; B23K 35/0244; B23K 35/3053;
(Continued)

(56) References Cited

U.S. PATENT DOCUMENTS 4,000,392 A * 12/1976 Banas ................ B23K 26/0643
219/121.63
4,835,357 A *  5/1989 Schalk .................... B23K 26/18
219/121.64
(Continued)

FOREIGN PATENT DOCUMENTS

DE    19643434 A1    5/1997
JP    63-230288 A    9/1988
(Continued)

OTHER PUBLICATIONS

Locke, David et al. Laser metal deposition defined. Insudstiral Laser Solutions for Manufacturing, vol. 250, Issue 6, Nov. 1, 2010, pp. 1-9 [online], [retrieved on Dec. 12, 2016]. Retrieved from the Internet <URL:http://www.industiral-lasers.com/articles/print/volume-250/issue-6/features/laser-metal-deposition.html>.*
(Continued)

*Primary Examiner* — Matthieu F Setliff
(74) *Attorney, Agent, or Firm* — Dickinson Wright PLLC

(57) ABSTRACT

A part, such as an automotive part, is provided. The part includes at least two work pieces of steel which are joined together at a weld seam which includes at least one of nickel and iron and is substantially entirely free of silicate islands. The part also includes a painted, phosphated or electro-
(Continued)

coated coating which is bonded with at least a portion of the substantially entirely silicate island free weld seam.

10 Claims, 2 Drawing Sheets

(51) Int. Cl.
- *B23K 35/02* (2006.01)
- *C25D 11/36* (2006.01)
- *C25D 13/20* (2006.01)
- *C25D 5/02* (2006.01)
- *B23K 26/32* (2014.01)
- *B23K 103/04* (2006.01)
- *B23K 103/00* (2006.01)

(52) U.S. Cl.
CPC ...... *B23K 35/3033* (2013.01); *B23K 35/3053* (2013.01); *C25D 5/02* (2013.01); *C25D 11/36* (2013.01); *C25D 13/20* (2013.01); *B23K 2203/04* (2013.01); *B23K 2203/50* (2015.10); *Y10T 403/479* (2015.01)

(58) Field of Classification Search
CPC .. B23K 2203/50; B23K 2203/04; C25D 5/02; C25D 13/20; C25D 11/36; Y10T 403/479
See application file for complete search history.

(56) References Cited

U.S. PATENT DOCUMENTS

| | | |
|---|---|---|
| 5,216,220 A | 6/1993 | Davis et al. |
| 2001/0008235 A1 | 7/2001 | Miszczak et al. |
| 2005/0205525 A1 | 9/2005 | Barhorst et al. |
| 2006/0186103 A1 | 8/2006 | Rajan |
| 2009/0202858 A1 | 8/2009 | Herber et al. |
| 2011/0300396 A1 | 12/2011 | Miller et al. |

FOREIGN PATENT DOCUMENTS

| | | |
|---|---|---|
| JP | 2010-075859 A | 4/2010 |
| JP | 2010-201434 A | 9/2010 |
| WO | 2006022642 A1 | 3/2006 |
| WO | 2006050688 A1 | 5/2006 |
| WO | 2010068804 A1 | 6/2010 |
| WO | 2011060432 A1 | 5/2011 |
| WO | 2012019115 A1 | 2/2012 |

OTHER PUBLICATIONS

Metal and Steel Classification—ASTM, AISI, SAE, ISO, and other codes. Reference guide [online]. Welders Universe 2012-2015 [retrieved on Dec. 12, 2016]. Retrieved from the Internet <URL:http://www.weldersuniverse.com/metals_classifications.html>.*

* cited by examiner

LASER METAL DEPOSITION WELDING OF AUTOMOTIVE PARTS

CROSS-REFERENCE TO PRIOR APPLICATIONS

This U.S. National Stage patent application claims the benefit of PCT International Patent Application Serial No. PCT/US2013/066494 filed Oct. 24, 2013 entitled "Laser Metal Deposition Welding Of Automotive Parts," which claims the benefit of U.S. Provisional Patent Application Ser. No. 61/718,089 filed Oct. 24, 2012, entitled "Laser Metal Deposition Welding Of Automotive Parts," the entire disclosures of the applications being considered part of the disclosure of this application and hereby incorporated by reference.

BACKGROUND OF THE INVENTION

1. Field of the Invention

This invention is related to welds between steel work pieces and, more particularly, to coatings applied to welds between steel work pieces.

2. Related Art

Gas-metal arc welding (GMAW), which is also known as metal inert gas (MIG) welding, is commonly employed to weld steel work pieces together in the automotive industry. A common problem with employing GMAW to join steel work pieces is the development of silicate islands of manganese, silicone, iron, oxygen and other trace alloys. Such silicate islands may inhibit the application of a coating onto the outer surface of the weld seam. For example, coatings applied through painting, phosphating and electrocoating (e-coating) may not adhere strongly to weld seams with silicate islands.

One approach to bonding painted, phosphated and electrocoated coatings with weld seams is to use a material abrasion process on the weld seam to remove the silicate islands. Another approach is to remove the silicate islands is through chemical processes. However, chemical processes may also be costly and may not result in sufficient removal of the silicate islands from the weld seam.

There remains a significant and continuing need for an improved process to join steel work pieces while allowing for painting, phosphating and electrocoating across the joint.

SUMMARY OF THE INVENTION

An aspect of the present invention provides for a part, such as an automotive part, including at least two work pieces of steel which are joined together at a weld seam which includes at least one of nickel and iron and is substantially entirely free of silicate islands. The part also includes a painted, phosphated or electrocoated coating which is bonded with at least a portion of the substantially entirely silicate island free weld seam. The weld seam is advantageous as compared to weld seams formed from other types of welding processes because its outer surface is very consistent and is substantially entirely free of silicate islands which allows for a very strong bond between the outer surface of the weld seam and the painted, phosphated or electrocoated coating. The weld seam of this aspect of the present invention may also be smoother and harder than weld seams formed through other known welding processes, e.g., weld seams from GMAW processes.

According to another aspect of the present invention, the weld seam includes nickel.

According to yet another aspect of the present invention, the weld seam includes iron.

According to still another aspect of the present invention, the coating is a painted coating.

According to a further aspect of the present invention, the coating is a phosphated coating.

According to still a further aspect of the present invention, the coating is an electrocoated coating.

Another aspect of the present invention is a method of making a part, such as an automotive part. The method includes the step of placing at least two work pieces of steel into a joint. The method proceeds with the step of melting with a laser beam a portion of each of the work pieces and a powder of at least one of nickel and iron to produce a weld seam which includes at least one of nickel and iron and is substantially entirely free of silicate islands. The method continues with the step of applying a coating onto at least a portion of the weld seam through a painting, phosphating or electrocoating process. The resulting bond between the painted, phosphated or electrocoated coating and the outer surface of the substantially entirely silicate island free weld seam is very strong, This improved bond is achieved in a very efficient and cost effective manner without any subsequent material abrasion or chemical processes.

According to another aspect of the present invention, the powder includes nickel.

According to yet another aspect of the present invention, the powder includes iron.

According to still another aspect of the present invention, the step of applying the coating is further defined as painting the coating.

According to a further aspect of the present invention, the step of applying the coating is further defined as phosphating the coating.

According to still a further aspect of the present invention, the step of applying the coating is further defined as electrocoating the coating.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
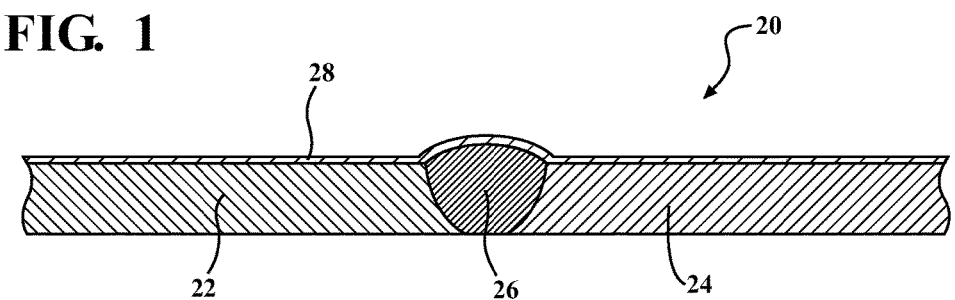
FIG. 1 is a cross-sectional view of an exemplary automotive part including a weld seam formed through a LMD welding process.

Referring to FIG. 1, an aspect of the present invention is related to a part 20, such as an automotive part 20, which includes at least two work pieces 22, 24 of steel that joined together at a weld seam 26 which includes at least one of nickel and iron. The part 20 also includes a coating 28 which was applied on top of at least a portion of the weld seam 26 through painting, phosphating or electrocoating (e-coating). As discussed in further detail below, the work pieces 22, 24 are joined together through a laser metal deposition (LMD) welding process which includes melting a nickel and/or iron powder 30 into the metal of the first and second work pieces 22, 24 such that the weld seam 26 includes nickel and/or iron and is substantially entirely free of silicate islands. This allows for a very strong bond between the metal of the weld seam 26 and the coating 28, thereby reducing the risk of the coating 28 falling off of or otherwise separating from the part 20 at the weld seam 26. The outer surface of the weld seam 26 may also be smoother than the weld seams formed from other known processes.

In the exemplary embodiment of FIG. 1, the work pieces 22, 24 are welded together in a butt joint. However, the work pieces 22, 24 may be joined together in any suitable type of welding joint including, for example, an edge joint, a corner joint, a T-joint, a lap joint, etc. The work pieces 22, 24 could be any suitable automotive or non-automotive work pieces 22, 24 made of steel. For example, the work pieces 22, 24 could be pieces 22, 24 of a vehicle frame or chassis and may have any suitable thicknesses. It should be appreciated that the use of the term "steel" herein is meant to include alloy steels.

Another aspect of the present invention provides for a method of making a part 20, such as the automotive part 20 shown in FIG. 1. The method includes the step of placing at least two work pieces 22, 24 of steel into a joint. Preferably, the work pieces 22, 24 are spaced from one another by a predetermined gap 32 (see FIG. 2), e.g. 0.4 mm. Referring now to FIG. 3, the method proceeds with the step of melting with a laser beam 34 material from the first and second work pieces 22, 24 and a powder 30 of nickel and/or iron. Preferably, a shielding gas 36, such as of carbon dioxide and/or argon, is used during the melting step to protect the melted area from atmospheric gasses. Upon cooling, the steel of the work pieces 22, 24 and the nickel and/or iron forms a very hard weld seam 26 which is substantially entirely free of silicate islands.

Figure 2:
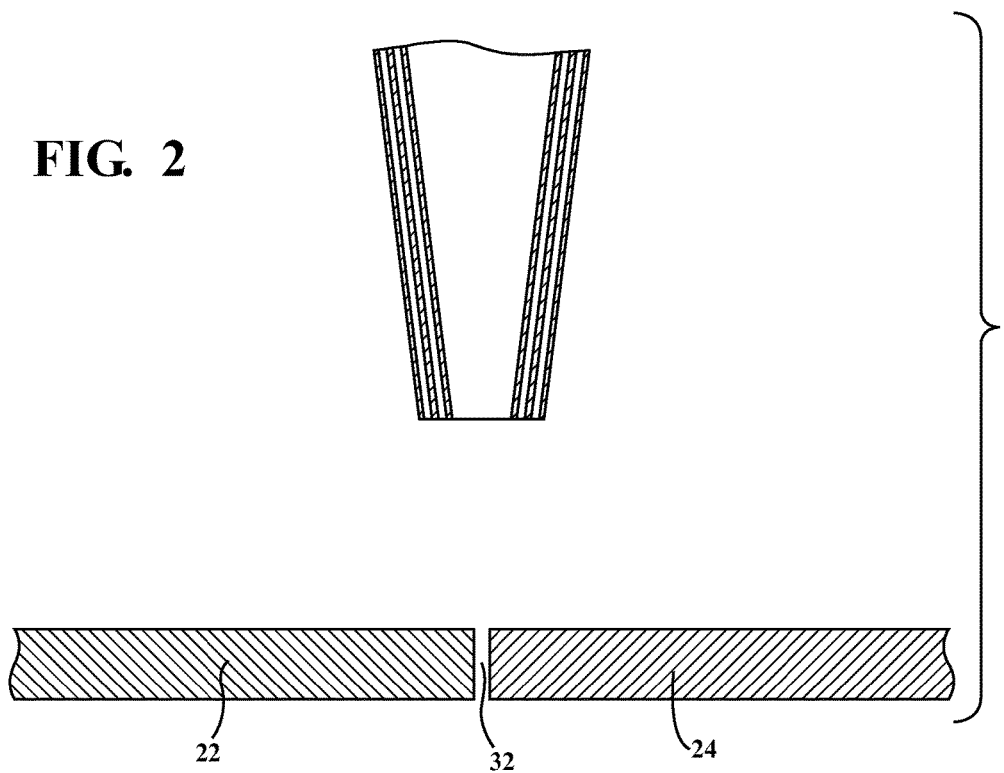
FIG. 2 is a cross-sectional view of a pair of exemplary work pieces placed into a butt joint.
Figure 3:
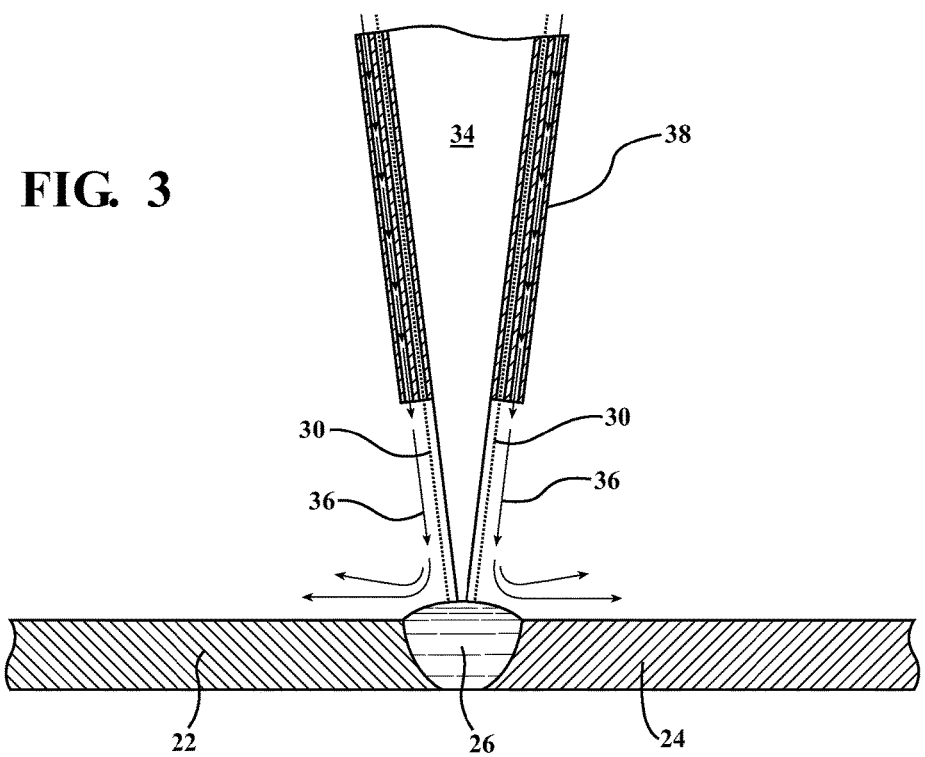
FIG. 3 is a schematic view showing an LMD head melting a portion of the work pieces of FIG. 2 and a nickel and/or iron powder.

Preferably, the laser beam 34, the nickel and/or iron powder 30, and the shielding gas 36 are all simultaneously emitted from a single LMD head 38, such as the LMD head 38 shown in FIGS. 2 and 3. This LMD head 38 may be moved relative to the work pieces 22, 24 or vice versa along the joint between the first and second work pieces 22, 24 to melt the material of the first and second work pieces 22, 24 and the nickel and/or iron powder 30 until the desired weld seam 26 is formed. The resulting weld seam 26 may be harder than the weld seams formed through other known processes.

Referring back to FIG. 1, the method proceeds with the step of applying a coating 28 onto the work pieces 22, 24 including onto at least a portion of the weld seam 26 with nickel and/or iron through at least one of painting, phosphating and electrocoating. Because the weld seam 26 is substantially entirely free of silicate islands, the bond between the coating 28 and the weld seam 26 is very strong. This process is particularly efficient and cost effective because no material abrasion or chemical processes are required after the work pieces 22, 24 are joined together and before the coating 28 is painted, phosphated or electrocoated onto the weld seam 26.

Obviously, many modifications and variations of the present invention are possible in light of the above teachings and may be practiced otherwise than as specifically described while within the scope of the appended claims.

The invention claimed is:

1. A method of making a part, comprising the steps of:
   placing at least two work pieces of steel into a joint;
   directing a stream of powder at the joint, the powder only consisting of nickel and iron or only consisting of nickel or only consisting of iron;
   melting with a laser beam a portion of each of the work pieces and the powder to produce a weld seam that is free of silicate islands; and
   without removing any material from the weld seam through material abrasion or chemical processes, applying a coating onto at least a portion of the weld seam through a painting, phosphating or electrocoating process.

2. The method as set forth in claim 1 wherein the powder only consists of nickel.

3. The method as set forth in claim 1 wherein the powder only consists of iron.

4. The method as set forth in claim 1 wherein the step of applying the coating is further defined as painting at least a portion of the weld seam.

5. The method as set forth in claim 1 wherein the step of applying the coating is further defined as phosphating at least a portion of the weld seam.

6. The method as set forth in claim 1 wherein the step of applying the coating is further defined as electrocoating at least a portion of the weld seam.

7. The method as set forth in claim 1 further including the step of directing a shielding gas at the joint.

8. The method as set forth in claim 7 wherein the shielding gas and the powder and the laser beam are all emitted from a single laser head.

9. The method as set forth in claim 8 wherein the laser beam and the powder and the shielding gas are all emitted from the single laser head co-axially with one another.

10. The method as set forth in claim 9 wherein the stream of powder is emitted radially outwardly of the laser beam and wherein the shielding gas is emitted radially outwardly of the stream, of powder.

* * * * *